United States Patent
Park et al.

Patent Number: 5,469,480
Date of Patent: Nov. 21, 1995

[54] MID-LOOP OPERATING METHOD FOR NUCLEAR POWER PLANT, AND FACILITY THEREFOR

[75] Inventors: Youn-Won Park; Jong-Kab Kim, both of Daejeon-Si, Rep. of Korea

[73] Assignee: Korea Institute of Nuclear Safety, Daejeon-Si, Rep. of Korea

[21] Appl. No.: 190,503

[22] Filed: Feb. 2, 1994

[30] Foreign Application Priority Data

Nov. 29, 1993 [KR] Rep. of Korea ............... 1993-25665

[51] Int. Cl.⁶ .................................................. G21C 15/18
[52] U.S. Cl. ........................................... 376/299; 376/298
[58] Field of Search ................................... 376/260, 277, 376/298, 299, 402

[56] References Cited

U.S. PATENT DOCUMENTS

| | | | |
|---|---|---|---|
| 4,957,693 | 9/1990 | Lau | 376/298 |
| 5,263,067 | 11/1993 | Ekeroth et al. | 376/298 |
| 5,268,943 | 12/1993 | Corletti et al. | 376/299 |
| 5,331,674 | 7/1994 | Evans et al. | 376/260 |

*Primary Examiner*—Daniel D. Wasil
*Attorney, Agent, or Firm*—Nikaido Marmelstein Murray & Oram

[57] ABSTRACT

The currently used atomic reactors has to be refueled periodically. During this refueling, the checking and repair of the major sections of the atomic reactor are carried out, and therefore, a low water level operation, i.e., mid-loop operation, is carried out for removing the residual heat. According to the present invention, a round-about pipe conduit is additionally installed between a suction pipe conduit and a discharge pipe conduit of the residual heating removing pump, and a flow rate adjusting valve is installed on the round-about pipe conduit. Thus the flow passing through the pump is maintained at the normal operation level during the mid-loop operation, while, as the residual heat is decreased, the round-about flow rate is gradually increased until the suction rate from the hot leg can be maintained at a proper level, thereby preventing the introduction of air into the residual heat removing pump.

2 Claims, 5 Drawing Sheets

FIG. 2

| DAYS → | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| TYPICAL PVNGS SEQUENCE | SHUTDOWN |  |  | ← — — → | |  | DEXTACK | |  |  | OFFLOAD | | | | → | |  | OPEN MANWAYS | | → |
| RECOMMENDED SEQUENCE | SHUTDOWN | ← — → |  |  |  | DEXTACK | |  | ← — → | |  | OFFLOAD | | | → | |  |  |  |  |
|  |  |  |  |  | OPEN MANWAYS | | ← — → | |  |  |  | EDDY CURRENT TESTING | | | | | | | | |

BENEFIT : 12 DAYS CRITICAL PATH SAVINGS

ADDITIONAL RECOMMENDATION : PERFORM A RE-ASSESSMENT OF SHUTDOWN RISKS
DURING MID-LOOP OPERATION

MID-LOOP OPERATING METHOD FOR NUCLEAR POWER PLANT, AND FACILITY THEREFOR

FIELD OF THE INVENTION

The present invention relates to a mid-loop operating method for nuclear power plants, and a facility therefor.

BACKGROUND OF THE INVENTION

In the currently used nuclear power plants, the nuclear fuel has to be replaced periodically. During this replacement of fuel, other major sections are checked for maintenance. During the checking and maintenance, a particularly important thing is that the steam generator tube is checked, so that it can be confirmed as to whether there is a leaking tube or a foreseeable leaking tube. Thus the leaking of tubes is prevented before entering into the next normal operation of the atomic reactor. In carrying out the checking of the steam generator tube, there is a pre-step to be undergone. That is, as shown in FIG. 1, the level of the cooling water for the atomic reactor is lowered, and then, there is installed a nozzle dam in the entrances of a hot leg and a cold leg.

However, even under this condition, the residual heat is continuously released from the atomic reactor, and therefore, this heat has to be eliminated. Such a low water head operation is called a mid-loop operation. For example, in the Korean atomic reactors such as No 3 and 4 of Youngkwang, and No. 3 and 4 of Ulchin, the discharge hole of the steam generator is not high enough relative to the hot leg. Therefore, the maximum extra height of the hot leg in which the residual heat removal outlet lies reaches only a height which is only one half of the diameter of the hot leg. Therefore, the water head becomes insufficient in the opening of the residual heat removing system, and air is introduced to induce cavitations, with the result that the pump for the residual heat removing system is lost.

The residual heat removing pump which is used in nuclear power plants has a capacity of 4000 GPM. Below 3000 GPM, the pump shows a rumbling phenomenon, and therefore, the flow rate is maintained above the level which is just necessary for removing the residual heat. Consequently, even under an insufficient water head in the hot leg during the mid-loop operation, a flow rate of over 3000 GPM is required, thereby increasing the possibility of air suction.

For this reason, the Palo Verde atomic reactor which is the original model of the atomic reactors of Youngkwang and Ulchin of Korea could not carry out the mid-loop operation so far, in spite of the fact that a permission for the mid-loop operation had been obtained from the NRC. In the economic aspect, it is reported that there is a significant difference between the case of carrying out the mid-loop operation and the case of not carrying out it. Even by referring to the domestically applied nuclear refueling program, it is found that the maintenance checking period is increased by about 15 days or more, if the mid-loop operation cannot be carried out.

Further, as shown in FIG. 2, according to the analysis of B & W company, in the case of the Palo Verde atomic reactor, if the steam generating nozzle dam can be installed when the used nuclear fuel is taken out and when the nuclear fuel is filled after opening the head of the reactor, then the repair period can be shorted by about 12–15 days.

ABB-CE installs a single nozzle dam instead of the generally used double nozzle dam in order to install the nozzle dam just after lifting the head of the atomic reactor, so that the water head within the suction hole of the residual heat removing system in the hot leg should be heightened. If the method of ABB-CE is used, a low water level alarm can heighten the water head by 2" from 101' 5" to 101' 7", while a low low water level alarm can heighten the water head by 1" from 101' 4" to 101' 5". Therefore, the nozzle dam can be installed so much faster, while the damage due to the air introduction can be excluded during the mid-loop operation.

However, even in such a method, the flow rate of the pump has to be maintained at the normal level, and therefore, even if the water head is raised by 2", if waves are formed on the water, the air introduction cannot be prevented.

Further, according to the domestically performed experiment, it is certain that the air introduction cannot be prevented with the increase of the water head by 2" at the mid-loop.

SUMMARY OF THE INVENTION

Therefore it is the object of the present invention to provide a partial water filled operating method and a facility therefor, in which the above described disadvantages of the conventional techniques are overcome.

BRIEF DESCRIPTION OF THE DRAWINGS

The above object and other advantages of the present invention will become more apparent by describing in detail the preferred embodiment of the present invention with reference to the attached drawings in which:

FIG. 2 illustrates the shortening of the repair period through the mid-loop operation for the purpose of describing the present invention;

DESCRIPTION OF THE PREFERRED EMBODIMENT

The best solution to the above described problem is to maintain the flow rate of the pump at the normal level, so that the water head should be raised, while avoiding the rumbling of the pump. Thus the air introduction into the suction tube of the residual heat removing system can be prevented during the mid-loop operation. As described before, during the mid-loop operation, the residual decay heat has to be continuously removed, but after 5 days from the stopping of the atomic reactor, the residual decay heat is very low, to such an extent that the actually required flow rate is about 2000 GPM.

Figure 1:
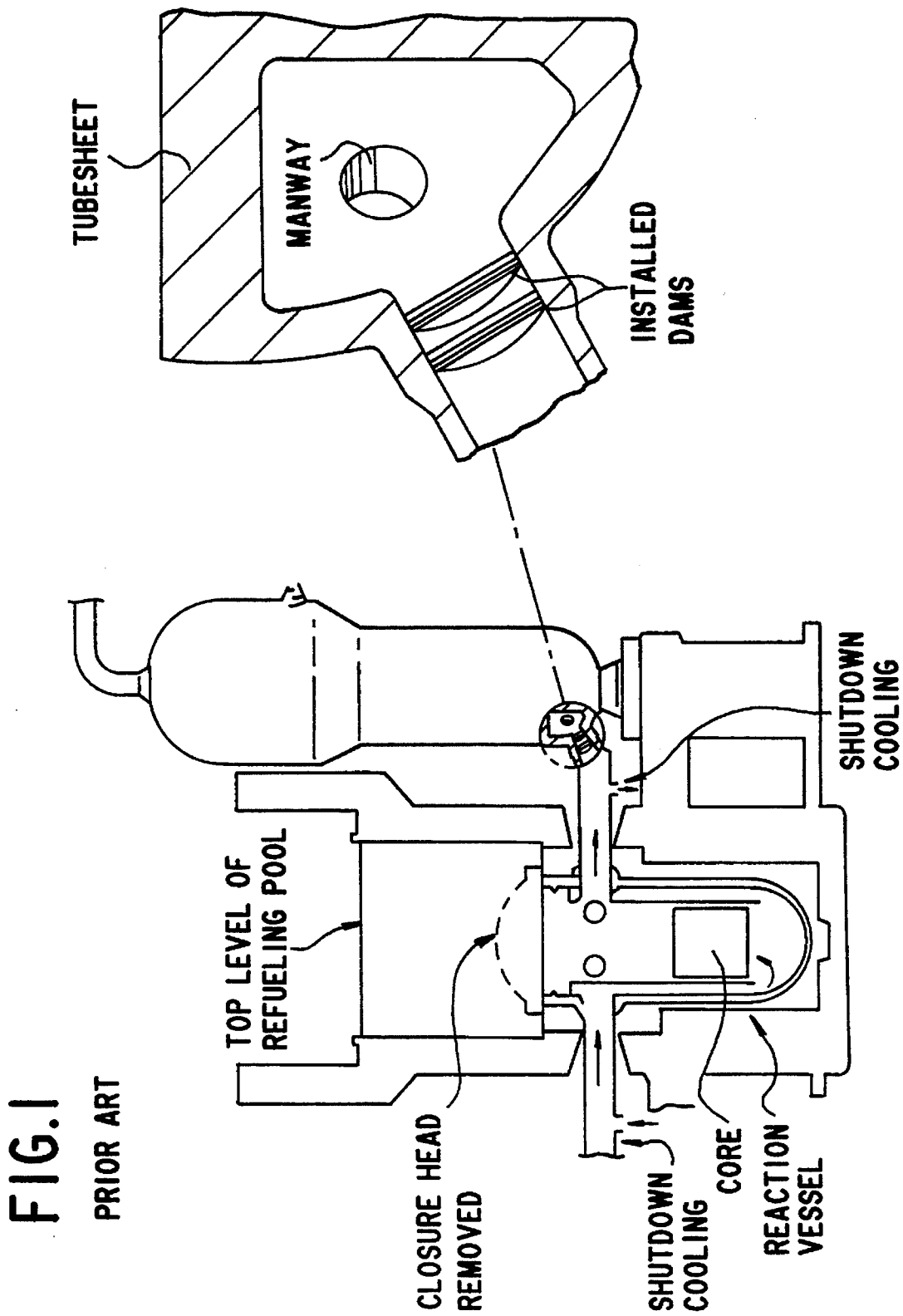
FIG. 1 is a schematic view showing the state of installing of a nozzle dam on the entrance of the hot and cold legs of the steam generator after lowering the water head in the currently used atomic reactor for the purpose of describing the present invention.
Figure 3:
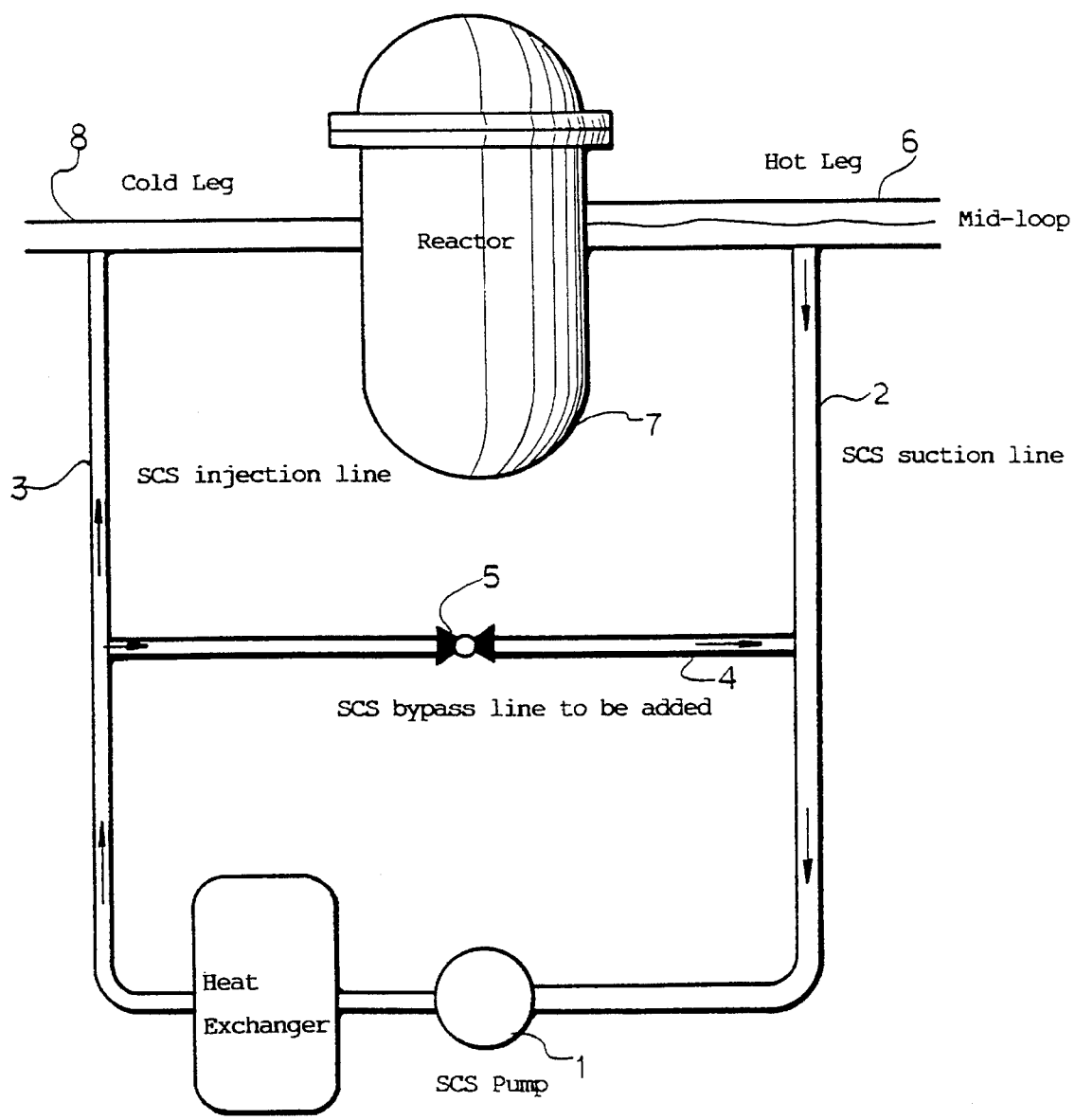
FIG. 3 illustrates the installation of a round-bout tube and a flow rate adjusting valve for adjusting the flow rate in the residual heat removing system for carrying out the present invention.
Figure 4:
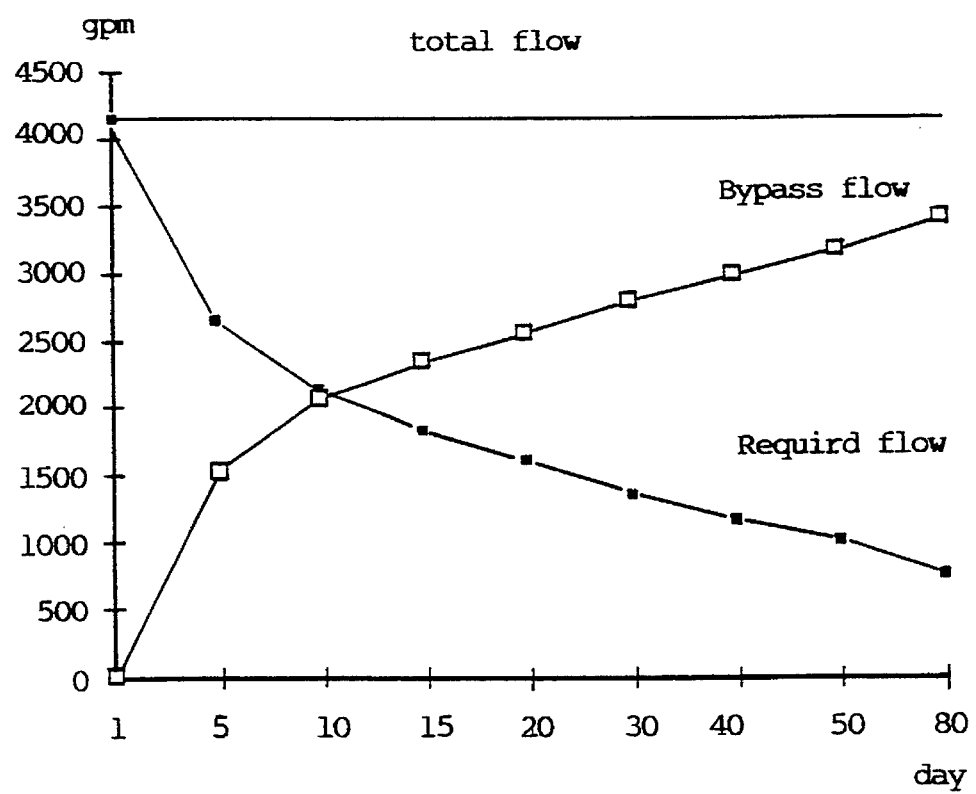
FIG. 4 illustrates the relation of the round-about flow rate to the flow rate necessary for removing the residual heat, which is the subject matter of the present invention.
Figure 5:
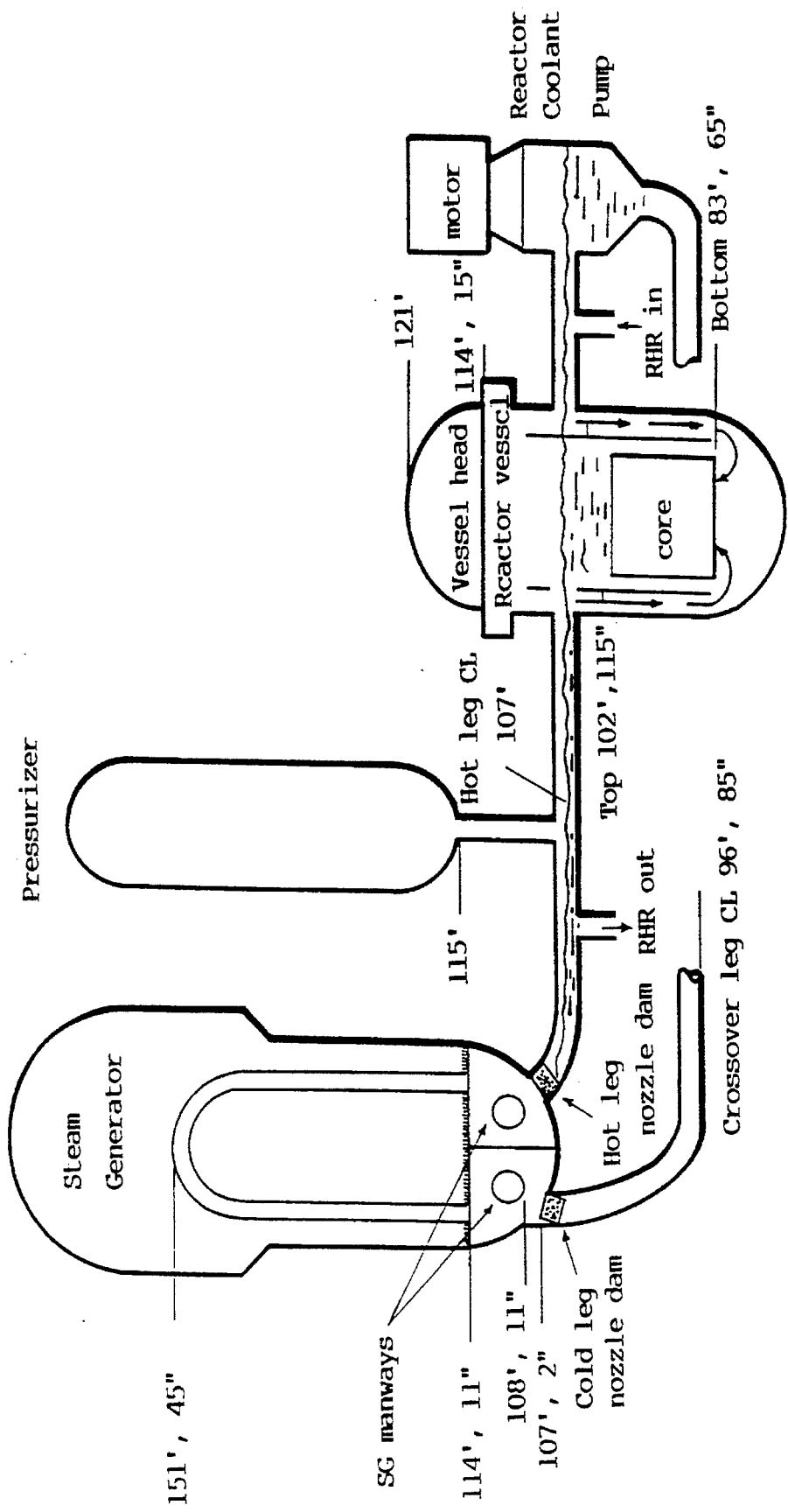
FIG. 5 illustrates the mid-loop operation in an atomic reactor.

Therefore, in order to meet the requirement, as shown in FIG. 3, a round-about pipe conduit 4 is installed between a suction pipe conduit 2 and discharge pipe conduit 3 of a residual heat removing pump 1, and a flow rate adjusting valve 5 is installed on the round-about pipe conduit 4. Thus, the flow rate which passes through the pump is maintained at the normal operation level, while the unnecessary flow corresponding to 2000 GPM is made to pass through the round-about pipe conduit 4. Therefore, even if the water head is low at the entrance of the residual heat removing system of a hot leg 6, the air introduction is prevented. For this purpose, the requirement is that a round-about pipe conduit of a proper size is additionally installed between the suction pipe entrance and the discharge pipe conduit of the residual heat removing pump, and a flow rate adjusting valve is installed on the round-about pipe conduit. Thus during the mid-loop operation, as the residual heat is gradually decreased, the round-about flow is gradually increased, so that the suction flow from the hot leg should be maintained at the proper level, thereby preventing the air introduction.

Reference code 7 in the drawings indicates a reactor, 8 a cold leg, and 9 a heat exchanger.

In the above described manner, the mid-loop operation can be speedily carried out, and therefore, the repair period can be shortened. If the analysis of B & W company is referred, a shortening of about 12 days can be realized. In the case of the nuclear power plant No. 2 of Gori of Korea, if the mid-loop operation is not carried out, the repair period is extended by about 20 days.

If this is converted into the economic gain, it is equivalent to an improvement of the efficiency of 4 to 6%. The nuclear power plants on which the present invention can be applied are about 10 plants including the nuclear power plants No. 3 and 4 of Youngkwang, No. 3 and 4 of Ulchin, and No 5 and 6 of Youngkwang, and the 4 nuclear power plants designed by ABB-CE i.e., Palo Verde Unit 1, 2, 3 and 4.

What is claimed is:

1. A mid-loop operating method carried out during nuclear refueling, characterized in that a round-about pipe conduit is additionally installed between a suction pipe conduit and a discharge pipe conduit of a residual heat removing pump; and a flow rate adjusting valve is installed on said round-about pipe conduit, so that the flow passing through said pump can be maintained at a predetermined normal operation flow level during a mid-loop operation, and round-about flow rate is gradually increased in accordance with the decrease of a residual heat of an atomic reactor, whereby a suction flow rate is maintained at a predetermined level, and introduction of air into the residual heat removing pump is prevented.

2. A mid-loop operating facility for nuclear power plants carried out during nuclear refueling, the facility comprising:

a round-about pipe conduit 4 installed between a suction pipe conduit 2 and a discharge pipe conduit 3 of a residual heat removing pump 1; and a flow rate adjusting valve 5 installed on said round-about pipe conduit 4.

* * * * *